(12) United States Patent
Wang et al.

(10) Patent No.: US 11,983,142 B2
(45) Date of Patent: May 14, 2024

(54) METHOD FOR MANAGING BACKUP DATA, ELECTRONIC DEVICE AND COMPUTER PROGRAM PRODUCT

(71) Applicant: EMC IP Holding Company LLC, Hopkinton, MA (US)

(72) Inventors: Yi Wang, Chengdu (CN); Qingxiao Zheng, Chengdu (CN); Haitao Li, Chengdu (CN); Ke Li, Chengdu (CN); Jingrong Zhao, Chengdu (CN); Geng Peng, Chengdu (CN); Pengfei Li, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 222 days.

(21) Appl. No.: 16/799,581

(22) Filed: Feb. 24, 2020

(65) Prior Publication Data

US 2021/0117288 A1  Apr. 22, 2021

(30) Foreign Application Priority Data

Oct. 17, 2019  (CN) .......................... 201910990225.9

(51) Int. Cl.
*G06F 16/11* (2019.01)
*G06F 11/14* (2006.01)
(Continued)

(52) U.S. Cl.
CPC ........ *G06F 16/113* (2019.01); *G06F 11/1451* (2013.01); *G06F 11/1461* (2013.01);
(Continued)

(58) Field of Classification Search
CPC ............. G06F 11/1464; G06F 11/1451; G06F 11/1461; G06F 11/1469; G06F 11/3034;
(Continued)

(56) References Cited

U.S. PATENT DOCUMENTS 7,904,679 B2 *  3/2011  Stager ................. G06F 11/1448
                                                            711/162
7,979,649 B1 *  7/2011  Thiam ................. G06F 11/1448
                                                            711/161
(Continued)

FOREIGN PATENT DOCUMENTS

CN        1627267 A      6/2005
CN      103154901 A      6/2013
(Continued)

*Primary Examiner* — Gautam Sain
*Assistant Examiner* — Wei Ma
(74) *Attorney, Agent, or Firm* — WOMBLE BOND DICKINSON (US) LLP (57) ABSTRACT

Embodiments of the present disclosure provide a method, device and computer program product for managing backup data. The method comprising: obtaining historical information of a plurality of historical operations on target data in a backup storage device during a first time period, the historical information indicating at least types and time of occurrences of the plurality of historical operations; determining, based on the historical information, whether the target data is to be rewritten to the backup storage device within a second time period after the first time period; and in response to determining that the target data is to be written to the backup storage device within the second time period, (Continued)

adjusting an expiration time of the target data in the backup storage device. Based on such a manner, efficiency of the backup system can be increased.

15 Claims, 4 Drawing Sheets

(51) Int. Cl.
*G06F 11/30* (2006.01)
*G06F 16/14* (2019.01)
*G06F 18/214* (2023.01)
*G06N 20/00* (2019.01)

(52) U.S. Cl.
CPC ...... *G06F 11/1464* (2013.01); *G06F 11/1469* (2013.01); *G06F 11/3034* (2013.01); *G06F 11/3075* (2013.01); *G06F 16/152* (2019.01); *G06F 18/214* (2023.01); *G06N 20/00* (2019.01)

(58) Field of Classification Search
CPC .............. G06F 11/3075; G06F 16/152; G06F 11/3072; G06F 16/113; G06K 9/6256; G06N 20/00
USPC ......................................................... 711/162
See application file for complete search history.

(56) References Cited

U.S. PATENT DOCUMENTS

| | | | |
|---|---|---|---|
| 2004/0030727 A1* | 2/2004 | Armangau | G06F 16/137 |
| 2004/0167901 A1 | 8/2004 | Margolus | |
| 2004/0168058 A1* | 8/2004 | Margolus | G06F 16/2358 |
| | | | 707/999.001 |
| 2006/0143443 A1* | 6/2006 | Cohen | H04L 9/0891 |
| | | | 714/E11.121 |
| 2007/0136381 A1* | 6/2007 | Cannon | G06F 11/1451 |
| 2008/0022061 A1 | 1/2008 | Ito et al. | |
| 2010/0169591 A1* | 7/2010 | Atluri | G06F 11/1469 |
| | | | 711/162 |
| 2012/0089572 A1* | 4/2012 | Raichstein | G06F 11/1461 |
| | | | 707/645 |
| 2016/0364156 A1* | 12/2016 | Haustein | G06F 11/1458 |
| 2018/0095816 A1* | 4/2018 | Fang | G06F 11/079 |
| 2018/0336210 A1* | 11/2018 | Bourgeois | G06F 3/0604 |

FOREIGN PATENT DOCUMENTS

| | | |
|---|---|---|
| CN | 104094236 A | 10/2014 |
| CN | 106155839 A | 11/2016 |

* cited by examiner

METHOD FOR MANAGING BACKUP DATA, ELECTRONIC DEVICE AND COMPUTER PROGRAM PRODUCT

CROSS-REFERENCE TO RELATED APPLICATION

This patent application claims priority, under 35 U.S.C. § 119, of Chinese Patent Application No. 201910990225.9, filed Oct. 17, 2019, which is incorporated by reference herein in its entirety.

FIELD

Embodiments of the present disclosure generally relate to the field of computer, and more specifically, to a method for managing backup data, an electronic device and a computer program product.

BACKGROUND

In recent years, with the development of computer technology, people pay more and more attention to security of data storage. Data backup becomes a common technology to ensure data security. As the scale of data that users need to back up becomes increasingly larger, more and more data needs to be written into the backup storage device of a limited backup system. Therefore, how to improve the efficiency of the backup system has become a focus.

SUMMARY

Embodiments of the present disclosure provide a scheme for managing backup data.

In accordance with the first aspect of the present application, it provides a method for managing backup data. The method comprising: obtaining historical information of a plurality of historical operations on target data in a backup storage device during a first time period, the historical information indicating at least types and time of occurrences of the plurality of historical operations; determining, based on the historical information, whether the target data is to be rewritten to the backup storage device within a second time period after the first time period; and in response to determining that the target data is to be written to the backup storage device within the second time period, adjusting an expiration time of the target data in the backup storage device.

In accordance with the second aspect of the present application, it provides a device for managing backup data. The device comprising: at least one processing unit; at least one memory coupled to the at least one processing unit and storing instructions executable by the at least one processing unit, the instructions, when executed by the at least one processing unit, causing the device to perform acts comprising: historical information of a plurality of historical operations on target data in a backup storage device during a first time period, the historical information indicating at least types and time of occurrences of the plurality of historical operations; determining, based on the historical information, whether the target data is to be rewritten to the backup storage device within a second time period after the first time period; and in response to determining that the target data is to be written to the backup storage device within the second time period, adjusting an expiration time of the target data in the backup storage device.

In accordance with the third aspect of the present disclosure, there is provided a computer program product stored in a non-transitory computer storage medium and comprising machine-executable instructions which, when executed by a device, cause the device to perform an action according to any steps of method in the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in exemplary embodiments of the present disclosure.

DETAILED DESCRIPTION OF EMBODIMENTS

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others may denote different or identical objects. The following text may also contain other explicit or implicit definitions.

Figure 1:
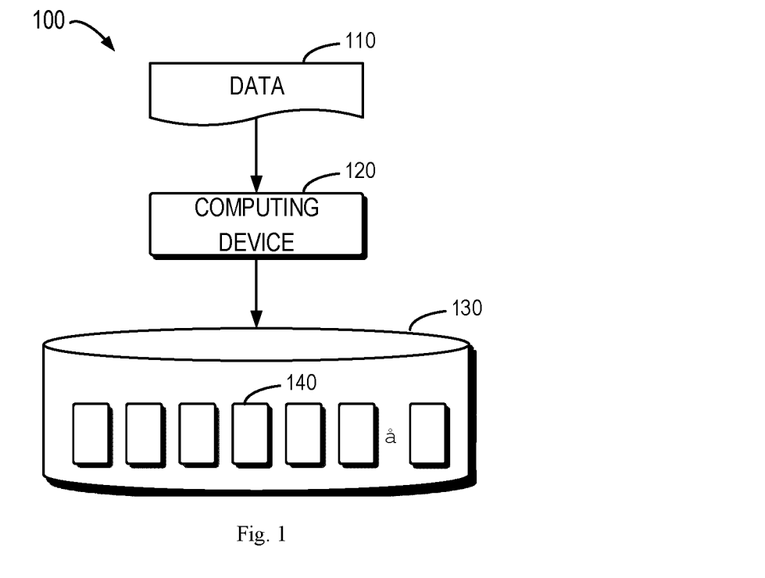
FIG. 1 is a diagram illustrating an example environment in which embodiments of the present disclosure herein may be implemented.

FIG. 1 is a diagram illustrating an example environment 100 in which embodiments of the present disclosure herein may be implemented. As shown in FIG. 1, the environment 100 includes a computing device 120 and a backup storage device 130. The computing device 120 may receive data 110 to be backed up and write the data 110 into the backup storage device 130 after preprocessing the data 110. Specifically, the computing device 120 may segment the data 110 according to a predetermined size, and such a size may be configured according to different requirements of backup systems.

Subsequently, the computing device 120 may further determine whether data has been stored in the backup storage device 130 according to hash value of data in each data block. If data has been stored in the backup storage device 130, the computing device 120 may avoid repeatedly writing the data into the block. Instead, the computing device 120 can write the data into the data block and record the hash value of the data block for the de-redundancy operation in a next backup.

In some embodiments, in view of a limited size of the backup storage device 130, the backup system may set an expiration time (for example, one month) for the data block 140 stored in the backup storage device 130. It should be understood that the expiration time can be set according to size of the backup storage device 130 and a user's demands for backup. When the expiration time of the data block 140 exceeds, that is, when the time since when the data block 140 was last backed up reaches the expiration time, the backup system may for example delete the expired data block 140 from the backup storage device 130.

As discussed above, as a scale of data that users need to back up becomes larger and larger, more and more data needs to be written to the limited backup storage device 130 of the backup system. Some data which is previously backed up in the backup system needs to be replaced with new backup data. However, after some backup data is deleted due to expiration, the data may also be repeatedly written into the backup storage device 130 within a short period of time. Therefore, such repeated deletion and writing will affect the efficiency of the backup system.

Embodiments of the present disclosure provide a solution for managing backup data. The solution comprises obtaining historical information of a plurality of historical operations for target data in a backup storage device during a first time period, wherein the historical information indicates at least types and time of occurrences of the multiple historical operations. It is then determined whether the target data is to be rewritten to the backup storage device within a second time period after the first time period based on the historical information. In accordance with a determination that the target data is to be written to the backup storage device within the second time period, an expiration time of the target data in the backup storage device is adjusted. The embodiments of the present disclosure can set different expiration times for different target data and set a longer expiration time for data that is more possible to be repeatedly written. With this method, when the data is backed up again, the data is in an unexpired state because the data has a long expiration time, and the embodiment of the present disclosure can save the overhead of rewriting data to the backup storage device again and improve the efficiency of your backup system.

Figure 2:
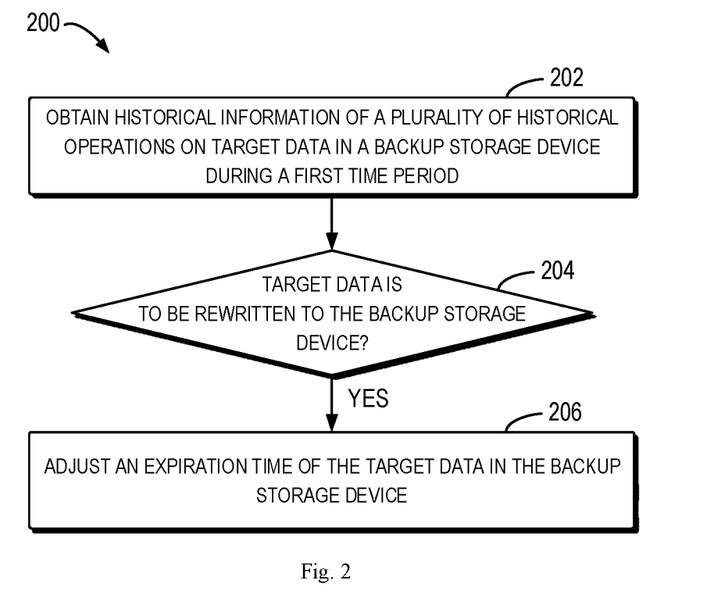
FIG. 2 is a flowchart illustrating a process of managing backup data according to an embodiment of the present disclosure.

Hereinafter, a process of managing backup data according to an embodiment of the present disclosure will be described with reference to FIGS. 2 to 5. FIG. 2 is a flowchart illustrating a process 200 of managing backup data according to an embodiment of the present disclosure. The process 200 may be implemented, for example, by the computing device 120 shown in FIG. 1.

At 202, the computing device 120 obtains historical information of a plurality of historical operations for target data during the backup storage device 130 in the first time period, wherein the historical information indicates at least types and time of occurrences of the plurality of historical operations.

In some embodiments, the computing device 120 may monitor various operations on the target data within a predetermined first time period. Specifically, in response to the historical operation on the target data within the first time period, the computing device 120 determines a hash value of the target data. Historical operations may include: a write operation based on a request of back up target data, and a delete operation that performs garbage collection based on the target data expiration.

In some embodiments, the computing device 120 may determine a hash value of the target data and store types and time of occurrence of the historical operation associated with the hash value. In some embodiments, the computing device 120 may, for example, maintain information about historical operations of the target data based on the historical information list.

Figure 3:
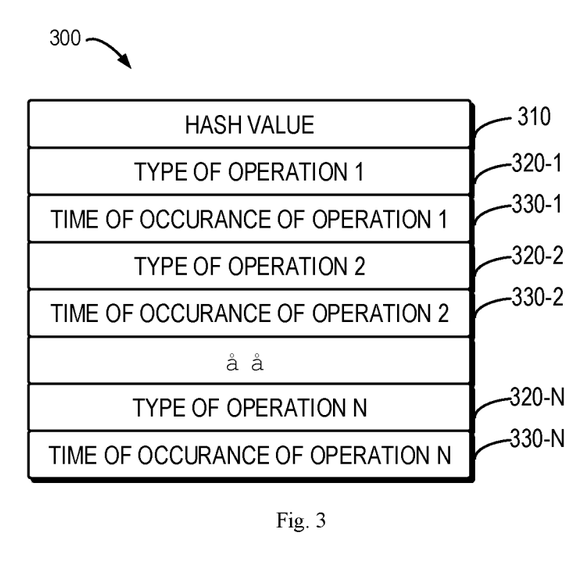
FIG. 3 is a diagram illustrating an example historical information list according to an embodiment of the present disclosure.

FIG. 3 is a diagram illustrating an example historical information list 300 according to an embodiment of the present disclosure. As shown in FIG. 3, a historical information list 300 may include a hash value 310 of target data and types 320-1, 320-2, and 330-N (individually or collectively referred to as operation types 320) of each subsequent operation on the target data and the time of occurrences 330-1, 330-2, and 330-N (individually or collectively referred to as time of occurrence 330) of the operation. Each time a new operation occurs, the computing device 120 may, for example, add a new entry at the end of the history information list 300 to record the type and the time of occurrence corresponding to the operation. In some embodiments, the computing device 120 may store a historical information list corresponding to each data block 140 in the backup storage device 130 in a coupled storage device.

With continued reference to FIG. 2, at 204, the computing device 120 determines whether the target data is to be rewritten to the backup storage device 130 within a second time period after the first time period based on the historical information. In some embodiments, the computing device 120 may determine whether the target data is to be re-written into the backup storage device in a subsequent second time period based on deletion and writing rules reflected by the historical information. In some embodiments, the length of the second time period can be set according to the needs of the backup system to achieve a balance between avoiding re-writing and the available backup space of the backup system.

In some embodiments, the computing device 120 may determine a metric for target data based on historical information. Examples of metrics may include: ☐

Number of times that target data has been written within the first time period. The computing device 120 may perform statistics on the history information list 300 to determine the total number of times that the target data has been written within the first time period. A higher total number means that the target data is more frequently rewritten. This metric may indicate the overall condition of the target data being rewritten within the first time period.

Time interval at which target data is written within the first time period. In some embodiments, the computing device 120 may determine the variance of the time interval between the occurrence times of adjacent writing operations in the history information list 300. A smaller variance indicates that the target data is rewritten at a relatively fixed frequency. This metric may indicate how well the target data is rewritten within the first time period.

Frequency at which the target data has been written in a specific time period within the first time period. In some embodiments, the computing device 120 may select the frequency at which the target data is written in the most recent time. This metric can indicate the tendency of the target data to be rewritten, for example, more frequent or less frequent. ☐

Time interval at which target data has been deleted within the first time period. In some embodiments, the computing device 120 may determine an average time interval between time of occurrences of adjacent deletion operations in the history information list 300. This metric may indicate how long the target data is retained and how often the target data is removed from the backup storage device 130 due to expiration time or manual deletion from a user.

The computing device 120 may utilize one or more of the above example metrics to predict whether the target data is to be rewritten into the backup storage device 130 within the second time period. It should be understood that any other suitable metrics can also be used for prediction. In some embodiments, the computing device 120 may determine whether the target data is to be rewritten to the backup storage device 130 within the second time period based on the determined metrics. In some embodiments, the computing device 120 may, for example, determine whether the target data is to be rewritten within a second time period based on a rule-based method. In some embodiments, the computing device 120 may also use a machine learning method to predict whether the target data is to be rewritten within the second time period.

Specifically, in some embodiments, the computing device 120 may utilize a machine learning model to process the metrics to determine whether the target data will be written to the backup storage device within the second time period. The machine learning model is trained based on at least one of the following: a reference metric determined based on a plurality of historical operations on the reference data in the third time period and an indication that whether the reference data is written into the backup storage device within the fourth time period after the third time period. Examples of machine learning models include, but are not limited to, various types of deep neural networks (DNN), convolutional neural networks (CNN), support vector machines (SVM), decision trees, random forest models, and so on.

In some embodiments, the computing device 120 may divide the historical operation information of the target data in the backup storage device 130 into a part for inputting a specific part and a part as a ground-truth value for training. For example, the computing device 120 may use a metric determined from the historical operation data of the target data in part of the storage device 130 between 18 months ago and 6 months ago as an input feature to the machine learning model. The computing device 120 may also determine whether the target data is rewritten in the past 6 months based on the historical operation data in the past 6 months and use the determination as the training target of the model. That is, through such training, the machine learning model can learn from the parameters of one year to predict whether data rewriting will occur in the next 6 months.

In some embodiments, the computing device 120 may also monitor in real time whether each data block 140 in the backup storage system 130 is rewritten in a subsequent fourth time period. For example, the computing device 120 may use a metric determined from historical information of the past year as an input feature of a machine learning model and use the monitoring result of whether data is re-written in the next year as a training target. With this approach, the computing device 120 may also train a machine learning model so that the machine learning model has the ability of predicting whether data rewriting will occur in a subsequent fourth time period.

In some embodiments, after obtaining a trained machine learning model, the computing device 120 may input metrics for the target data into the machine learning model as features to obtain an indication that whether the target data is to be rewritten within a second time period.

With continued reference to FIG. 2, in response to determining at 204 that the target data is to be written to the backup storage device 130 within the second time period, the method proceeds to 206, that is, the computing device 120 adjusts the expiration time of the target data in the backup storage device in 130. In some embodiments, the computing device 120 may, for example, set an expiration time for the target data that is longer than the default expiration time so that the target data is not to expire before the next rewriting.

In some embodiments, the computing device 120 may further determine an expiration time for the target data according to the historical information. Specifically, the computing device 120 may determine a set of time intervals between a plurality of writing operations of the target data within the first time period based on the historical information.

Figure 4:
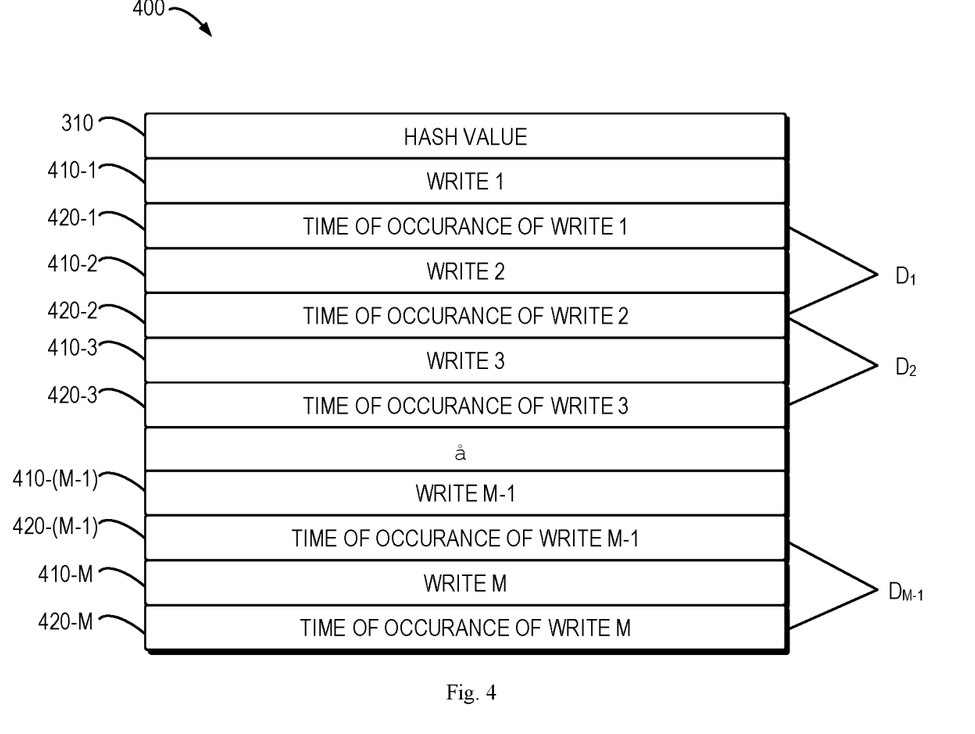
FIG. 4 is a diagram illustrating a historical writing list according to an embodiment of the present disclosure.

FIG. 4 is a diagram illustrating a historical writing list 400 according to an embodiment of the present disclosure. As shown in FIG. 4, the computing device 120 may extract a history writing list 400 corresponding to a writing operation based on the history information list 300. The historical writing list 400 may include a hash value of 300 and subsequent multiple writing operations 410-1, 410-2, 410-3, 410-(M−1), and 410-M (individually or collectively referred to as writing operations 410) and the corresponding time of occurrences 420-1, 420-2, 420-3, 420-(M−1), and 420-M.

As shown in FIG. 4, the interval between occurrence time 420-1 of writing operation 1 and occurrence time 420-2 of writing operation 2 can be expressed as D1, the interval between occurrence time 420-2 of writing operation 2 and occurrence time 420-3 of writing operation 3 can be expressed as D2 and the interval between occurrence time 420-(M−1) of writing operation M−1 and occurrence time 420-M of writing operation M can be expressed as $D_{M-1}$.

In some embodiments, the computing device 120 may determine an expiration time of the target data based on a set of time intervals. In one example, the computing device 120 may select a time interval with a maximum interval time as the expiration time from the set of time intervals. In another example, the computing device 120 may select an average value of the time intervals as the expiration time.

Alternatively, the computing device 120 may also filter the set of time intervals to exclude time intervals with excessive fluctuations. Specifically, in some embodiments, based on the degree of change between two adjacent time intervals in a set of time intervals, the computing device 120 may determine at least one time interval from the set of time intervals.

Taking FIG. 4 as an example, the computing device 120 may calculate a time difference between two adjacent time intervals, for example, $\Delta T_m = |D_{m+1} - D_m|$. The computing device 120 may further determine an average value of the time difference values and filter out time interval pairs whose time difference values are greater than a specific threshold (e.g., an average value of the time difference values) and thereby determine at least one time interval from the set of time intervals. Based on this method, it is possible to avoid the impact of certain culling due to the writing of certain unexpected conditions in the first time period, so that the determined expiration time can better conform to the general law of the target data.

In some embodiments, the computing device 120 may further determine an expiration time of the target data in the backup storage device based on at least one time interval. For example, the computing device 120 may calculate an average value of at least one time interval obtained by filtering, and use the average value as an expiration time of the target data. The expiration time set through such a way can make the target data to reduce the possibility of being rewritten in a short time after being deleted due to expiration.

Figure 5:
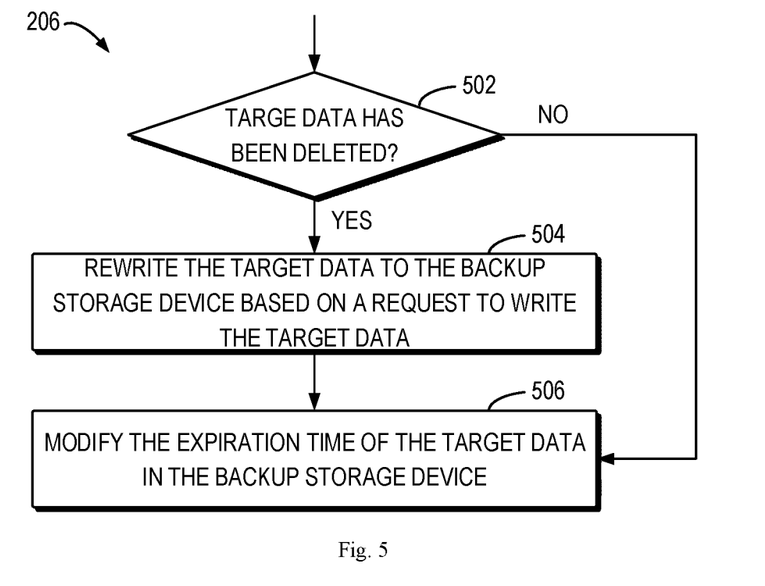
FIG. 5 is a flowchart illustrating a process of adjusting expiration time according to another embodiment of the present disclosure.

In some embodiments, the target data discussed above may include data still stored in the backup storage device 130 and historical backup data deleted from the backup storage device 130 due to expiration. Embodiments of the present disclosure may perform different processes for two different types of target data. The specific process of 206 will be described below with reference to FIG. 5. FIG. 5 is a flowchart illustrating a process of adjusting expiration time according to another embodiment of the present disclosure.

As shown in FIG. 5, at 502, the computing device 120 may determine whether the target data has been deleted in the backup storage device 130. In response to determining that the target data has not been deleted at 502, the method may proceed directly to 506, where the computing device 120 may modify the expiration of the target data in the backup storage device 130 based on the method of determining the expiration time as described above.

In contrast, in response to determining that the target data is deleted in the backup storage device 130 at 502, the method may proceed to 504, where the computing device 120 may rewrite the target data into the backup storage device 130 based on a request of writing the target data. Subsequently, at 506, the computing device 120 may also modify the expiration time of the target data in the backup storage device 130 when rewriting data, so that the rewritten target data has an expiration time longer than the default expiration time.

When the default expiration time of the backup storage device 130 exceeds, the computing device 120 does not reclaim the target data whose expiration time is adjusted by the method described above, because they are set to have a longer expiration time. Based on this method, when the target data is subsequently backed up again, as the target data has a longer expiration time and is still in an unexpired state, the embodiments of the present disclosure can save the overhead of re-writing to the backup storage device and thereby improve efficiency of the backup system.

Figure 6:
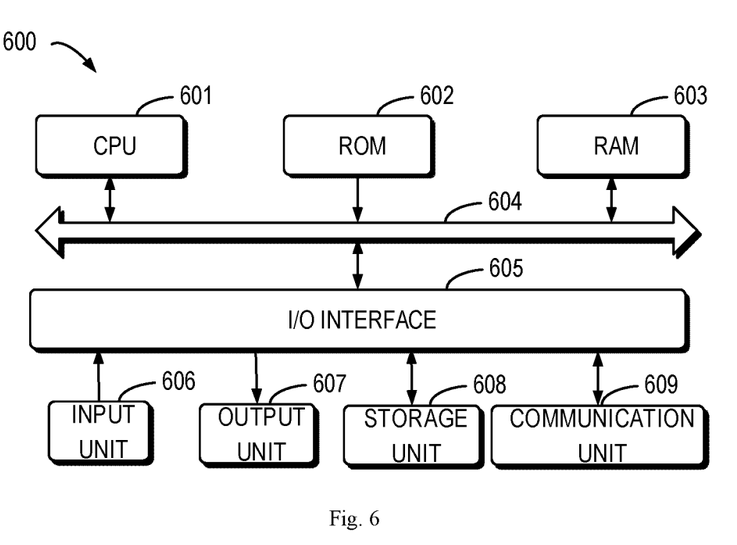
FIG. 6 is a block diagram illustrating an example device 600 used to implement embodiments of the present disclosure.

FIG. 6 shows a schematic block diagram of an example device 600 that can be used to implement embodiments of the present disclosure. For example, the computing device 120 according to embodiments of the present disclosure can be implemented by device 600. As shown, device 600 includes a central processing unit (CPU) 601 that can perform various appropriate actions according to computer program instructions stored in read only memory (ROM) 602 or loaded from storage unit 608 into a random access memory (RAM) 603. In the RAM 603, various programs and data required for the operation of the device 600 can also be stored. The CPU 601, the ROM 602, and the RAM 603 are connected to each other through a bus 604. An input/output (I/O) interface 605 is also coupled to bus 604.

A plurality of components in device 600 are coupled to I/O interface 605, including: input unit 606, such as a keyboard, mouse, etc.; output unit 607, such as various types of displays, speakers, etc.; storage unit 608, such as a disk and an optical unit, etc.; and a communication unit 609 such as a network card, a modem, a wireless communication transceiver, and the like. Communication unit 609 allows device 600 to exchange information/data with other devices over a computer network such as the Internet and/or various telecommunication networks.

The various processes and processes described above, such as method 200, may be performed by processing unit 601. For example, in some embodiments, method 200 can be implemented as a computer software program that is tangibly embodied in a machine readable medium, such as storage unit 608. In some embodiments, some or the entire computer program may be loaded and/or installed onto device 600 via ROM 602 and/or communication unit 609. One or more actions of method 200 described above may be performed when a computer program is loaded into RAM 603 and executed by CPU 601.

The present disclosure can be a method, device, system and/or computer product. The computer product can include a computer readable storage medium with computer readable program instructions for performing various aspects of the present disclosure thereon.

A computer readable storage medium may be a tangible device that can hold and store the instructions used by the instruction execution device. The computer readable storage medium can be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage media include: portable computer disks, hard disks, random access memory (RAM), read only memory (ROM), erasable programmable read only memory (EPROM) or flash memory), static random access memory (SRAM), portable compact disk read only memory (CD-ROM), digital versatile disk (DVD), memory stick, floppy disk, mechanical encoding device, for example, the hole card with instructions stored thereon or raised structure in groove, and any suitable combination of the above. The computer readable storage medium as used herein is not to be interpreted as a transient signal itself, such as a radio wave or other freely propagating electromagnetic wave, an electromagnetic wave propagating through a waveguide or other transfer medium (e.g., a light pulse through a fiber optic cable), or the electrical signal transferred through a wire.

The computer readable program instructions described herein can be downloaded from a computer readable storage medium to various computing/processing devices, or downloaded to an external computer or external storage device over a network, such as the Internet, a local area network, a wide area network, and/or a wireless network. The network may include copper transfer cables, fiber optic transfers, wireless transfers, routers, firewalls, switches, gateway computers, and/or edge servers. A network adapter card or a network interface in each computing/processing device receives computer readable program instructions from the network and forwards the computer readable program instructions for storage in a computer readable storage medium in each computing/processing device.

Computer program instructions for performing the operations of the present disclosure may be assembly instructions, instruction set architecture (ISA) instructions, machine instructions, machine related instructions, microcode, firmware instructions, state setting data, source code or object code written or in any combination of one or more programming languages including object oriented programming languages, such as Smalltalk, C++ and so on, as well as conventional procedural programming languages, such as "C" language or similar programming language. The computer readable program instructions can be executed entirely on the user's computer, partly on the user's computer, as a stand-alone software package, partly on the user's computer and partly on the remote computer, or entirely on the remote computer or server. In the case of a remote computer, the remote computer can be connected to the user's computer through any kind of network, including a local area network (LAN) or wide area network (WAN), or can be connected to an external computer (e.g., using an Internet service provider to access the Internet connection). In some embodiments, the customized electronic circuit, such as a programmable logic circuit, a field programmable gate array (FPGA), or a programmable logic array (PLA), can be customized by utilizing state information of computer readable program instructions. The electronic circuit can execute computer readable program instructions to implement various aspects of the present disclosure.

Various aspects of the disclosure are described herein with reference to flowcharts and/or block diagrams of methods, devices (systems) and computer products according to embodiments of the present disclosure. It will be understood that each block of the flowchart illustrations and/or block diagrams, and combinations of blocks in the flowcharts and/or block diagrams can be implemented by computer readable program instructions.

These computer readable program instructions can be provided to a processing unit of a general purpose computer, a special purpose computer or other programmable data processing apparatus to produce a machine such that when the instructions are executed by processing unit via a computer or other programmable data processing apparatus, devices that implement the functions/acts specified in one or more of the flowcharts and/or block diagrams are produced. The computer readable program instructions can also be stored in a computer readable storage medium that causes the computer, programmable data processing device, and/or other device to operate in a particular manner, such that the computer readable medium storing the instructions includes an article of manufacture that includes instructions for implementing various aspects of the functions/acts recited in one or more blocks of the flowcharts and/or block diagrams.

Computer readable program instructions can also be loaded onto a computer, other programmable data processing device, or other device to perform a series of operational steps on a computer, other programmable data processing device or other device to produce a process that a computer is implemented such that instructions executed on a computer, other programmable data processing apparatus, or other device implement the functions/acts recited in one or more of the flowcharts and/or block diagrams.

The flowchart and block diagrams in the drawings illustrate the architecture, functionality, and operation of possible implementations of devices, methods, and computer products according to various embodiments of the present disclosure. In this regard, each block in the flowchart or block diagram can represent a module, a program segment, or a portion of an instruction, module, the program segment, or a portion of the instruction includes one or more executable instructions for implementing principles. In some alternative implementations, the functions noted in the blocks may also occur in a different order than those illustrated in the drawings. For example, two consecutive blocks may be executed substantially in parallel, and they may sometimes be executed in a reverse order, depending upon the functionality involved. It is also noted that each block of the block diagrams and/or flowcharts, and combinations of blocks in the block diagrams and/or flowcharts, can be implemented in a dedicated hardware-based system that performs the specified function or action of principle or can be implemented with a combination of dedicated hardware and computer instructions.

The embodiments of the present disclosure have been described above, and the foregoing description is illustrative, not limiting, and not limited to the disclosed embodiments. Numerous modifications and changes will be apparent to those skilled in the art without departing from the scope of the invention. The choice of terms used herein is intended to best explain the principles, practical applications, or technical improvements of the techniques on the market, or enable other ordinary technical staffs in the art to understand the embodiments in the disclosure.

We claim:

1. A method of managing backup data, comprising:
   obtaining historical information of a plurality of historical operations on target data in a backup storage device during a first time period, the historical information indicating at least types and time of occurrences of the plurality of historical operations, wherein the historical information is stored in a memory as a historical information list that includes a hash value of the target data, a type of a historical operation, from the plurality of historical operations, on the target data and a time of an occurrence of the historical operation;
   determining, based on the historical information, a first time interval between time of occurrences of adjacent deletion operations within the first time period at which the target data has been deleted;
   determining whether the target data is to be rewritten to the backup storage device within a second time period after the first time period based on the first time interval;
   in response to determining that the target data is to be written to the backup storage device within the second time period, determining whether the target data has been deleted from the backup storage device due to expiration, wherein the deleted target data is stored as historical backup data;
   in response to determining that the target data has been deleted from the backup storage device due to expiration, rewriting the target data, from the historical backup data, to the backup storage device based on a request to write the target data; and
   adjusting an expiration time of the target data in the backup storage device, wherein adjusting the expiration time further comprises:
     computing a plurality of second time intervals between a plurality of write operations of the target data within the first time period based on the historical information;
     determining a third time interval from the plurality of second time intervals based on a degree of change in time between two adjacent second time intervals in the plurality of second time intervals; and adjusting the expiration time of the target data in the backup storage device based on the third time interval.

2. The method of claim 1, wherein obtaining the historical information comprises:

in response to the historical operation on the target data during the first time period, determining the hash value of the target data; and storing the type and the time of the occurrence of the historical operation in association with the hash value.

3. The method of claim 1, wherein determining whether the target data is to be rewritten to the backup storage device within the second time period comprises:

determining a metric for the target data based on the historical information, the metric comprising the first time interval; and determining, based on the metric, whether the target data is to be rewritten to the backup storage device within the second time period.

4. The method of claim 3, wherein determining, based on the metric, whether the target data is to be written to the backup storage device within the second time period comprises:

processing the metric with a machine learning model to determine whether the target data is to be written to the backup storage device within the second time period, wherein the machine learning model is trained based on at least one of: a reference metric determined based on a plurality of historical operations on reference data during a third time period, and an indication of whether the reference data are written to the backup storage device within a fourth time period after the third time period.

5. The method of claim 1, further comprising:

determining an average time interval of the plurality of second time intervals, wherein each one of the plurality of second time intervals is an amount of time between two adjacent write operations from the plurality of write operations;

filtering out one or more second time interval pairs from the plurality of second time intervals whose difference in time is greater than the average time interval to produce a filtered plurality of second time intervals; and determining the third time interval based on the filtered plurality of second time intervals.

6. An electronic device, comprising:

at least one processing unit;

at least one memory coupled to the at least one processing unit and storing instructions executable by the at least one processing unit, the instructions, when executed by the at least one processing unit, causing the device to perform acts comprising:

obtaining historical information of a plurality of historical operations on target data in a backup storage device during a first time period, the historical information indicating at least types and time of occurrences of the plurality of historical operations, wherein the historical information is stored in a memory as a historical information list that includes a hash value of the target data, a type of a historical operation, from the plurality of historical operations, on the target data and a time of an occurrence of the historical operation;

determining, based on the historical information, a first time interval between time of occurrences of adjacent deletion operations within the first time period at which the target data has been deleted;

determining whether the target data is to be rewritten to the backup storage device within a second time period after the first time period based on the first time interval;

in response to determining that the target data is to be written to the backup storage device within the second time period, determining whether the target data has been deleted from the backup storage device due to expiration, wherein the deleted target data is stored as historical backup data;

in response to determining that the target data has been deleted from the backup storage device due to expiration, rewriting the target data, from the historical backup data, to the backup storage device based on a request to write the target data; and adjusting an expiration time of the target data in the backup storage device, wherein adjusting the expiration time further comprises:

computing a plurality of second time intervals between a plurality of write operations of the target data within the first time period based on the historical information;

determining a third time interval from the plurality of second time intervals based on a degree of change in time between two adjacent second time intervals in the plurality of second time intervals; and adjusting the expiration time of the target data in the backup storage device based on the third time interval.

7. The device of claim 6, wherein obtaining the historical information comprises:

in response to the historical operation on the target data during the first time period, determining the hash value of the target data; and storing the type and the time of the occurrence of the historical operation in association with the hash value.

8. The device of claim 6, wherein determining whether the target data is to be rewritten to the backup storage device within the second time period comprises:

determining a metric for the target data based on the historical information, the metric comprising the first time interval; and determining, based on the metric, whether the target data is to be rewritten to the backup storage device within the second time period.

9. The device of claim 8, wherein determining, based on the metric, whether the target data is to be written to the backup storage device within the second time period comprises:

processing the metric with a machine learning model to determine whether the target data is to be written to the backup storage device within the second time period, wherein the machine learning model is trained based on at least one of: a reference metric determined based on a plurality of historical operations on reference data during a third time period, and an indication of whether the reference data are written to the backup storage device within a fourth time period after the third time period.

10. The device of claim 6, wherein the instructions cause the device to perform further acts comprising:

determining an average time interval of the plurality of second time intervals, wherein each one of the plurality of second time intervals is an amount of time between two adjacent write operations from the plurality of write operations;

filtering out one or more second time interval pairs from the plurality of second time intervals whose difference in time is greater than the average time interval to produce a filtered plurality of second time intervals; and determining the third time interval based on the filtered plurality of second time intervals.

11. A computer program product being tangibly stored on a non-transitory computer readable medium and comprising machine-executable instructions which, when executed in a device, cause the device to perform operations, the operations comprising:

obtaining historical information of a plurality of historical operations on target data in a backup storage device during a first time period, the historical information indicating at least types and time of occurrences of the plurality of historical operations, wherein the historical information is stored in a memory as a historical information list that includes a hash value of the target data, a type of a historical operation, from the plurality of historical operations, on the target data and a time of an occurrence of the historical operation;

determining, based on the historical information, a first time interval between time of occurrences of adjacent deletion operations within the first time period at which the target data has been deleted;

determining whether the target data is to be rewritten to the backup storage device within a second time period after the first time period based on the first time interval;

in response to determining that the target data is to be written to the backup storage device within the second time period, determining whether the target data has been deleted from the backup storage device due to expiration, wherein the deleted target data is stored as historical backup data;

in response to determining that the target data has been deleted from the backup storage device due to expiration, rewriting the target data, from the historical backup data, to the backup storage device based on a request to write the target data; and adjusting an expiration time of the target data in the backup storage device, wherein adjusting the expiration time further comprises:

computing a plurality of second time intervals between a plurality of write operations of the target data within the first time period based on the historical information;

determining a third time interval from the plurality of second time intervals based on a degree of change in time between two adjacent second time intervals in the plurality of second time intervals; and adjusting the expiration time of the target data in the backup storage device based on the third time interval.

12. The computer program product of claim 11, wherein obtaining the historical information comprises:

in response to the historical operation on the target data during the first time period, determining the hash value of the target data; and storing the type and the time of the occurrence of the historical operation in association with the hash value.

13. The computer program product of claim 11, wherein determining whether the target data is to be rewritten to the backup storage device within the second time period comprises:

determining a metric for the target data based on the historical information, the metric comprising the first time interval; and determining, based on the metric, whether the target data is to be rewritten to the backup storage device within the second time period.

14. The computer program product of claim 13, wherein determining, based on the metric, whether the target data is to be written to the backup storage device within the second time period comprises:

processing the metric with a machine learning model to determine whether the target data is to be written to the backup storage device within the second time period, wherein the machine learning model is trained based on at least one of: a reference metric determined based on a plurality of historical operations on reference data during a third time period, and an indication of whether the reference data are written to the backup storage device within a fourth time period after the third time period.

15. The computer program product of claim 11, wherein the machine-executable instructions cause the device to perform further operations comprising:

determining an average time interval of the plurality of second time intervals, wherein each one of the plurality of second time intervals is an amount of time between two adjacent write operations from the plurality of write operations;

filtering out one or more second time interval pairs from the plurality of second time intervals whose difference in time is greater than the average time interval to produce a filtered plurality of second time intervals; and determining the third time interval based on the filtered plurality of second time intervals.

\* \* \* \* \*